United States Patent [19]
Goldman

[11] Patent Number: 5,260,707
[45] Date of Patent: Nov. 9, 1993

[54] PHASE COHERENT INTERFERENCE SIGNAL SUPPRESSION SYSTEM AND METHOD

[75] Inventor: Herbert B. Goldman, Tustin, Calif.

[73] Assignee: Hughes Aircraft Company, Los Angeles, Calif.

[21] Appl. No.: 289,162

[22] Filed: Dec. 22, 1988

[51] Int. Cl.$^5$ .................. G01S 7/36; G01S 3/86; H04B 1/10

[52] U.S. Cl. .................. 342/16; 342/383; 342/384; 455/278.1; 455/304

[58] Field of Search .............. 342/16, 17, 19, 383, 342/384, 378; 455/278, 304

[56] References Cited

U.S. PATENT DOCUMENTS

| | | | |
|---|---|---|---|
| 2,226,836 | 12/1940 | Sinninger | 455/278 |
| 3,870,996 | 3/1975 | Miller | 342/16 |
| 3,881,177 | 4/1975 | Len et al. | 342/16 |
| 3,896,442 | 7/1975 | Hemingway et al. | 342/17 |
| 4,628,320 | 12/1986 | Downie | 342/16 |
| 4,851,847 | 7/1989 | Clarkson | 342/17 |

*Primary Examiner*—Gilberto Barrón, Jr.
*Attorney, Agent, or Firm*—Wanda K. Denson-Low

[57] ABSTRACT

An interference signal suppression system and method that suppresses coherent jamming signals. The system comprises first and second receiving antennas that are physically separated from each other to generate non-coherent received signals of interest. The antennas are positioned to receive communication signals that are jammed with coherent energy. The separation distance is typically 40 to 50 wavelengths of the non-coherent scattered wave radio frequency signals. Phase and amplitude adjustment circuitry is provided that alters the phase and amplitude of the received signals such that the coherent received signals are balanced and out-of-phase. These signal are then summed in a summing circuit and the output of this circuit generates signals wherein the coherent signals are nulled and the non-coherent signals are detectable. The signal suppression system and method is independent of the direction of arrival of the coherent signals, which overcomes limitations of conventional techniques.

10 Claims, 2 Drawing Sheets

PHASE COHERENT INTERFERENCE SIGNAL SUPPRESSION SYSTEM AND METHOD

BACKGROUND OF THE INVENTION

1. Field of the Invention

The present invention relates to a device and method for suppressing coherent jamming signals received in a scattered signal receiving system and more particularly to such a device and method using a pair of physically spaced antennas and a phase and amplitude adjusting circuit to null coherent jamming signals.

2. Background of the Invention

The use of radio frequency signals deflected and/or defracted from various layers of the ionosphere for long distance radio communication systems is well known. Such communication systems are further widely used in military applications.

In a military environment, it is also common for an enemy to use jamming signals directed at receiving antennas for the purpose of disrupting the operation of the communication systems. One method used to overcome jamming signals is to use frequency hopping systems. In this type of system the carrier frequency of the transmitter and receiver are switched rapidly and in synchronism over a multiplicity of frequencies. Such systems are effective to the extent that they demand that an enemy produce jamming signals at most if not all of the frequencies used in the frequency hopping scheme. However, even in the best case, jamming signals will be effective against portions of the transmission thereby significantly reducing system performance. It is therefore desirable to provide a communication system having a capability of distinguishing between communication signals and jamming signals to thereby reduce the effect of jamming signals even when they are being produced at a communication system operating frequency.

Ionospheric and/or tropospheric scattered (reflected) radio frequency signals, because they traverse a multiplicity of transmission path lengths between transmitter and receiver, arrive at different points in space as a non-coherent signal. In contrast, a jamming signal propagates from a single source and will arrive at a receiving antenna as a substantially coherent signal. Even if several jamming signals are being generated at a single source or from a plurality of sources, each of the jamming signals will retain this characteristic of being a coherent signal at the receiving antenna. This characteristic difference between a scattered signal communication signal and an interference signal provides the basis of the present invention.

SUMMARY OF THE INVENTION

The present invention is an interference signal suppression system which comprises a first and second receiving antenna positioned to receive a communication signal and which are physically spaced one from the other. Phase and amplitude altering means are coupled to one of the antennas for altering the phase and amplitude of the signal received at that antenna by an amount corresponding to the phase and amplitude difference between the signals at the two antennas resulting from the physical spacing thereof. Means are provided for inverting the signal received at one of the antennas.

The signal from the phase and amplitude altering means and the signal received at the other antenna are summed. This results in the coherent signals being nulled one by the other. The non-coherent signals do not null and can therefore be captured by known methods for demodulating non-coherent radio frequency signals.

In a specific embodiment of the invention, the first and second receiving antennas will be spaced between forty and fifty wavelengths from each other to ensure that the tropospheric reflected scattered signal exhibits the required noncoherence at the two antenna locations.

It is therefore an object of the invention to provide a system for suppressing phase coherent interference signals in a reflected scattered signal communication system.

It is another object of the invention to provide such a system which is capable of distinguishing between a reflected scattered wave signal and a coherent jamming signal.

Still another object of the invention is to provide such a system which utilizes a pair of physically displaced antennas and which includes means for nulling the coherent jamming signals received at the antennas.

A BRIEF DESCRIPTION OF THE DRAWINGS

These and other objects and purposes of the invention will be best understood in view of the following detailed description of the invention taken in conjunction with the accompanying drawings wherein; FIG. 1 is a diagramatic illustration of a typical reflected scattered wave communication system; FIG. 2 is a block diagram of a coherent jamming signal suppression system in accordance with the invention; and FIGS. 3a through 3e are graphical representation of received communication and jamming signals useful in explaining operation of the invention.

DESCRIPTION OF A PREFERRED EMBODIMENT

Figure 1:
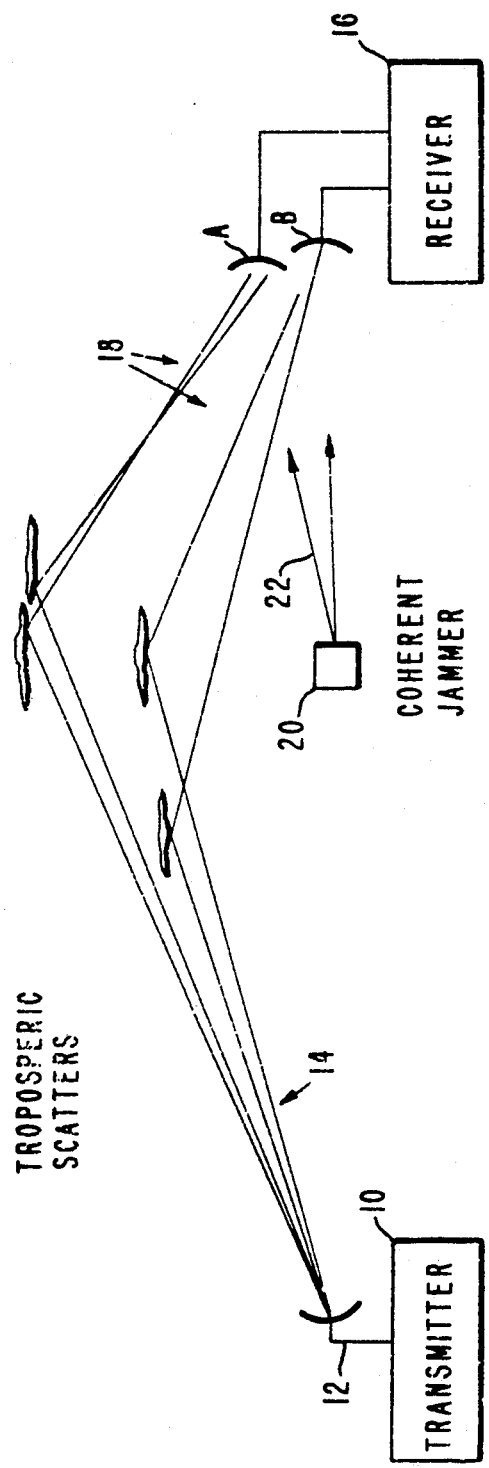

Referring first to FIG. 1, there is shown a communication system which includes a transmitter 10 having an antenna 12 for transmitting a radio frequency signal 14, indicated by rays 14, to a receiver 16. The receiver 16 is provided with a pair of antennas A and B which receive the transmitted signal 14. The system is specifically adapted to propagate the transmitted signal 14 into the ionosphere where the signal is deflected downwardly to the receiving antennas A, B. As is well known, ionized particles in a troposphere will deflect radio signals by various mechanisms such as reflection and defraction, this deflection being a function of signal frequency, angles of incidence of the transmitted signal, and various variable characteristics of the ionosphere layers, clouds and water vapor sheets. Significant to the present invention, is that the ionosphere functions to scatter signal 14. Accordingly, different portions of the deflected signals traverse the transmission path over paths of different distances and at different angles. This will result in a multiplicity of signal portions 18 which arrive at the receiver location with multiple phase angle and amplitude variations. The various signal portions or fragments will also be variously distorted by noise and other random interference factors due to the multiplicity of transmission paths. As a consequence, the various signal fragments arrive at the receiver as non-coherent or uncorrelated signals at different points of reception. A similar phenomenon occurs with target reflected signals such as are received in a radar system due to variations in the reflection of the transmitted signal by various parts of a target.

Also shown in FIG. 1 is a coherent jammer 20. The jammer 20 may be either airborne or surface based and typically comprises a high power radio frequency signal transmitter to generate and transmit a jamming signal indicated by rays 22. The jamming signal may be of single or multiple frequency. Sophisticated jamming systems, may also include means to track a frequency hopped communication signal in which case signal 22 may comprise a multiplicity of segments of different frequencies. Significant to the present invention, the signal 22 will, because it emanates from a single source and is not a reflected signal, arrive at any single reception point as a substantially coherent or correlated signal.

Referring to FIGS. 3a through 3e, there are shown a plurality of waveforms useful in explaining this phenomenon. FIG. 3a illustrates a typical fragment 26 of a radio frequency communication signal 14. This same signal fragment, after it has been deflected by the ionosphere, will arrive at an arbitrary point in space with a time (or phase) shift $\Delta_1$. The value of $\Delta_1$ can vary over a considerable range. Similarly, the signal fragments 26 at any particular arbitrary point in space will be variously distorted as a function of the particular propagation path. The magnitude of the signal fragment 26 will also vary from point to point in space as a function of the propagation path. As a consequence, the received signal fragments 26 as shown in FIG. 3b will vary in phase, amplitude, and, to a lesser degree, in waveform. Accordingly, the various signal fragments 26 will be non-coherent or uncorrelated at different points in space.

Figure 3:
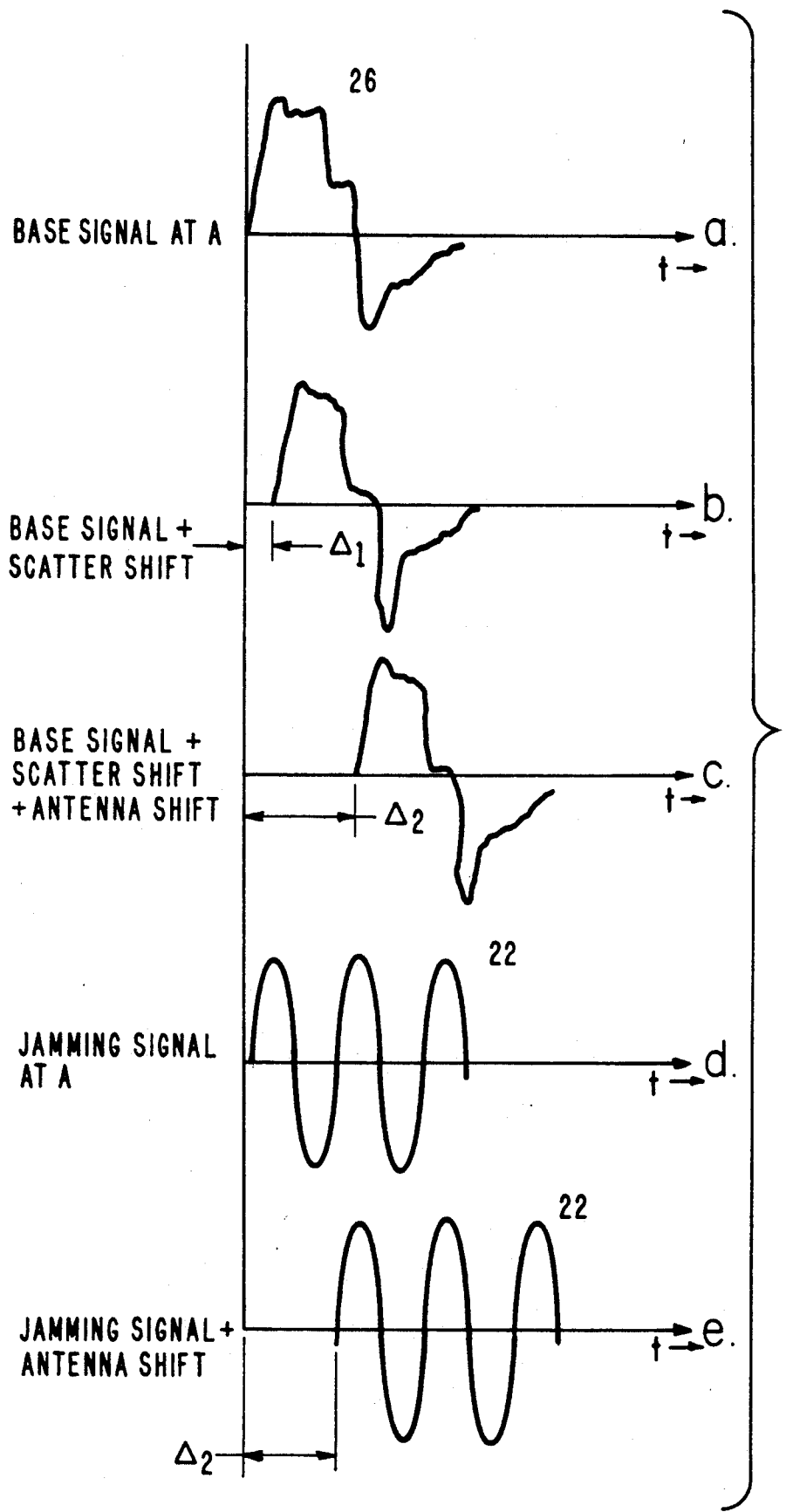

In contrast, the jamming signal 22 shown in FIG. 3 will arrive at any reception point substantially as transmitted. The received signal 22 will exhibit a shift in phase $\Delta_2$ (FIG. 3e). However, this shift will be substantially a linear function of a physical displacement between the reception points. Similarly, variations in amplitude of the received signal 22 will be substantially linear functions of the displacement between reception points. The amplitude of the received signal 22 received at different points in space can therefore be altered and the phase or time delay altered at the various reception points, such that the two signals will be correlated or coherent.

Referring again to FIG. 1, physically displacing the antennas A, B, ensures that the signals 18 received at the two antennas will be uncorrelated, non-coherent signals. In a working embodiment of the invention, it has been found that physically displacing the two antennas about 40 to 50 wavelengths from each other substantially ensures that the two scattered signals 18 received by the antennas A, B, will be uncorrelated signals.

The same physical displacement of the two antennas A, B will also produce a shift in the phase and amplitude of the jamming signal 22. The signals are otherwise coherent. Simultaneous sensing of the phase and amplitude of the signals 22 received at antennas A and B provides sufficient information to alter one of the received jamming signals in phase and amplitude such that it will again be coherent with the signal 22 received by the other antenna.

Figure 2:
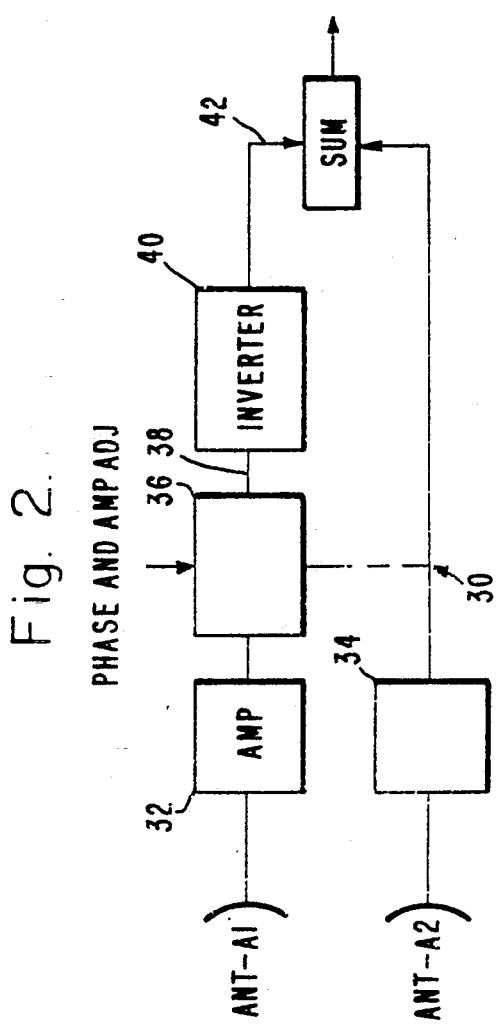

Referring to FIG. 2, there is shown a block diagram of the jamming signal suppression system indicated generally at 30. The system includes a conventional receiving amplifiers 32 and 34 associated with respective ones antennas A and B. The output from amplifier 32 is input to phase and amplitude adjusting circuit 36. Phase and amplitude adjusting circuit 36 is also connected to receive the output from amplifier 34. The phase and amplitude adjusting circuit 36 senses differences in the phase and amplitude of coherent signals 22 received at antennas A, and B and output from the amplifiers 32 and 34. Circuit 36 adjusts the phase and amplitude of the jamming signal output from amplifier 32 to produce a jamming signal output signal at output terminal 38 that is identical to the jamming signal output by amplifier 34. This output signal from amplifier 32 is then passed through a conventional inverter 40 and the output from the inverter 40 and the output from the amplifier 34 are then summed in a conventional summing circuit 42. Because the jamming signals 22 received at antennas A, B are coherent except for the phase and amplitude variance caused by the physical displacement thereof, the phase and amplitude adjustment of one of these signals in conjunction with inverting of one of the signals will result in the sum of the two signals of 0. The two jamming signals will therefore null each other. In contrast, because the various fragments 26 of the transmitted communication signal 14 received at the two antennas A and B are uncorrelated, this phase and amplitude adjustment is ineffective to synchronize or otherwise correlate the two signals. Accordingly, even after phase and amplitude adjustment and inversion, summing of the uncorrelated signals will produce an output signal that enables recovery of the original transmitted information signal 14 This signal can be demodulated utilizing well known methods and devices for demodulating non-coherent or uncorrelated reflected signals. Such a method or circuit is, for example, described in *I.D. reference* and any other of a large number of sources known in the a prior art.

In view of the above discussion, it will now be apparent that the system and the method of the present invention provides an effective means for suppressing or nulling coherent jamming signals transmitted and received in a reflected scattered wave transmission system while permitting reception of tropospheric scattered communication and reflected radar signals.

While the invention has been described in conjunction with a specific circuit and method, various modifications thereto will be obvious to those skills in the art without departing from the spirit any scope of the invention.

What is claimed is:

1. A phase coherent interference signal suppression system comprising: first and second receiving antennas positioned to receive a non-coherent scattered radio frequency signal, said antennas being physically spaced one from the other by about 40 to 50 wavelengths of said non-coherent scattered wave radio frequency signal, means coupled to said antennas to produce first and second coherent signals of equal amplitude and opposite phase, means for summing the output of said phase and amplitude altering means and the signal received at the other of said antennas, whereby coherent signals received by said antennas are nulled.

2. The system of claim 1 further including first and second amplifier means connected to said first and to said second antennas, respectively, for amplifying signals received thereby.

3. The system of claim 2 wherein said phase and amplitude altering means includes means for sensing the amplitude of coherent signals received at each of said antennas and means for adjusting the amplitude of one of said coherent signals to match the other of said signals.

4. The system of claim 3 wherein said phase and amplitude altering means each further includes means for sensing the phase of coherent signals received at said antennas and adjusting the phase of one of said coherent signals to be 180° out of phase with the coherent signals received at the other of said antennas.

5. The system of claim 4 wherein said non-coherent signals are tropospheric scattered radio frequency signals.

6. The system of claim 4 wherein said non-coherent signals are target reflected signals.

7. The system of claim 4 or wherein said coherent signals are non-reflected point generated jamming signals.

8. A method of suppressing coherent jamming signals received by a radio communication system adapted to receive reflected and scattered non-coherent radio frequency signals, said method comprising the steps of:

positioning first and second radio frequency receiving antennas at positions physically spaced from each other by about 40 to 50 wavelengths of the radio frequency signals processed thereby to cause the reflected and scattered radio frequency signals received thereby to be non-coherent;

sensing the phase and amplitude of coherent radio frequency signals received at each of said antennas;

altering the phase of one of said coherent signals to render said coherent signals equal equal in magnitude;

inverting one of said coherent signals; and summing said non-coherent and said coherent signals, whereby said coherent signals are nulled.

9. The method of claim 8 further including the step of amplifying signals received by said first and second antennas.

10. A phase coherent interference signal suppression system for detecting communications signals in the presence of coherent interference signals, said system comprising:

first and second receiving antennas spaced apart by a distance of about 40 to 50 wavelengths of said communications signals, and adapted to receive said comunications signals and coherent interference signals, and wherein the spaced apart antennas cause the communications signals to decorrelate and become non-coherent signals;

adjustment means coupled to one of said antennas for adjusting the phase and amplitude of the signals received at said one antenna to produce first and second coherent interference signals having equal amplitude and opposite phase; and summing means for summing output signals provided by said adjustment means and signals received at the other of said antennas, whereby coherent signals received by said antennas are suppressed and the non-coherent signals are detected.

* * * * *